US008868652B2

(12) United States Patent
Dey et al.

(10) Patent No.: US 8,868,652 B2
(45) Date of Patent: *Oct. 21, 2014

(54) SYSTEMS AND METHODS FOR FEDERATING OPEN SOCIAL NETWORKS FOR ANALYSES

(75) Inventors: Kuntal Dey, New Delhi (IN); Ruta Mehta, Mumbai (IN); Natwar Modani, Haryana (IN); Seema Nagar, New Delhi (IN); Amit Anil Nanavati, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 187 days.

This patent is subject to a terminal disclaimer.

(21) Appl. No.: 12/944,918

(22) Filed: Nov. 12, 2010

(65) Prior Publication Data

US 2012/0124134 A1    May 17, 2012

(51) Int. Cl.
*G06F 15/16* (2006.01)
*G06Q 10/10* (2012.01)

(52) U.S. Cl.
CPC ...................................... *G06Q 10/10* (2013.01)
USPC ........................................................ 709/204

(58) Field of Classification Search
CPC ....... H04L 67/306; H04L 51/32; H04L 67/24; H04L 67/30
USPC .......................................................... 709/204
See application file for complete search history.

(56) References Cited

U.S. PATENT DOCUMENTS

| | | | | |
|---|---|---|---|---|
| 2006/0271564 A1* | 11/2006 | Muntz et al. | ................... | 707/100 |
| 2011/0137932 A1* | 6/2011 | Wable | ........................... | 707/769 |
| 2011/0153421 A1* | 6/2011 | Novikov et al. | ............ | 705/14.52 |
| 2011/0276631 A1* | 11/2011 | Schmitt | ......................... | 709/205 |
| 2012/0215865 A1* | 8/2012 | Sacks et al. | ................... | 709/206 |

* cited by examiner

*Primary Examiner* — Oscar Louie
*Assistant Examiner* — Lin Liu
(74) *Attorney, Agent, or Firm* — Ference & Associates LLC

(57) ABSTRACT

Methods and arrangements for constructing and analyzing federated social networks. A first social network with a first plurality of accounts is defined, as well as a second social network with a second plurality of accounts, the second social network being unaffiliated with the second social network. The first and second social networks are federated to determine a union of the first and second social networks and an intersection of the first and second social networks, and second-order connections between one or more of the first plurality of accounts and one or more of the second plurality of accounts are ascertained, the second-order connections including connections outside of the intersection of the first and second social networks and within the union of the first and second social networks.

5 Claims, 13 Drawing Sheets

502

| Social Network | #Nodes | Edge Density | Size of Max SCC | Effective Diameter |
|---|---|---|---|---|
| OrgChart | 428723 | 1.00 | 2 | 11 |
| Peers | 428723 | 21.50 | 125305 | 18 |
| Papers | 2956 | 12.86 | 2884 | 8 |
| Patents | 26821 | 8.83 | 23888 | 11 |
| Friends | 52035 | 7.68 | 50056 | 10 |
| Tagging | 60174 | 1.68 | 2151 | 11 |
| TagInSim | 57364 | 495.04 | 55432 | 6 |
| TagOutSim | 4134 | 13.96 | 3767 | 7 |
| Community | 6083 | 649.65 | 6078 | 5 |
| Bookmarks | 14893 | 129.19 | 14404 | 6 |

| Social Network | Source | Description | Network type |
|---|---|---|---|
| OrgChart | Organizational Structure | An employee is connected to his manager | Directed |
| Peers | Organizational Structure | An employee is connected to his manager, to those who work under his manager, and to those who work under him. | Undirected |
| Papers | Papers | An employee is connected to his paper co-authors | Undirected |
| Patents | Patents | An employee is connected to his patent co-authors | Undirected |
| Friends | Friend list | An employee is connected to all who are in his contact list | Undirected |
| Tagging | Tag me | An employee is connected to the person who he tagged | Directed |
| TagInSim | Tag me | An employee is connected to the one who shares a tag with him | Undirected |
| TagOutSim | Tag me | An employee is connected to the one who tagged the same person with the same tag as him. | Undirected |
| Community | Communities | Employees belonging to the same community are connected to each other. | Undirected |
| Bookmarks | Social Bookmarking | Employees bookmarked same URL are connected to each other | Undirected |

FIG. 4

| Social Network | #Nodes | Edge Density | Size of Max SCC | Effective Diameter |
|---|---|---|---|---|
| OrgChart | 428723 | 1.00 | 2 | 11 |
| Peers | 428723 | 21.50 | 125305 | 18 |
| Papers | 2956 | 12.86 | 2884 | 8 |
| Patents | 26821 | 8.83 | 23888 | 11 |
| Friends | 52035 | 7.68 | 50056 | 10 |
| Tagging | 60174 | 1.68 | 2151 | 11 |
| TagInSim | 57364 | 495.04 | 55432 | 6 |
| TagOutSim | 4134 | 13.96 | 3767 | 7 |
| Community | 6083 | 649.65 | 6078 | 5 |
| Bookmarks | 14893 | 129.19 | 14404 | 6 |

| Team Size | # Coworker set | # Distributed teams |
|---|---|---|
| 3 | 45 | - |
| 4 | 10 | 6 |
| 5 | 5 | 16 |
| 6 | 1 | 7 |
| 7 | 0 | 3 |
| 8 | 0 | 1 |

FIG. 8

| # Team | # Memberships in coworker sets | # Memberships in distributed teams |
|---|---|---|
| 1 | 99 | 38 |
| 2 | 25 | 17 |
| 3 | 11 | 13 |
| 4 | 6 | 5 |
| 5 | 0 | 2 |
| 6 | 0 | 2 |
| 7 | 0 | 2 |
| 8 | 0 | 1 |

FIG. 9

| Property | Coworker AND TagInSim | Coauthor AND TagInSim | Peers AND TagInSim |
|---|---|---|---|
| # Nodes | 4262 | 4662 | 23723 |
| # Edges | 12900 | 16368 | 94352 |
| Max SCC | 72 (1.7%) | 2916 (62.5%) | 616 (2.59%) |
| Relative density | 3.03 from 3.9 Coworkers | 3.5 from 9.6 of Coauthors | 3.98 from 21.5 Peers |
| Edge coverage | 20.32% edges of Coworkers are covered | 6.29% edges of Coauthors are covered | 1.02% edges of Peers are covered |

FIG. 11

| Property | Coworker AND TagOutSim | Coauthor AND TagOutSim | Peers AND TagOutSim |
|---|---|---|---|
| # Nodes | 594 | 290 | 896 |
| # Edges | 1190 | 624 | 1730 |
| Max SCC | 17 (2.8%) | 71 (24.5%) | 20 (2.2%) |
| Relative density | 2 from 3.9 Coworkers | 2.15 from 9.6 of Coauthors | 1.93 from 21.5 of Peers |
| Edge coverage | 1.87% edges of Coworkers are covered | 0.24% edges of Coauthors are covered | 0.0188% edges of Peers are covered |

FIG. 12

*Definition 1. (Independent set)* A set of graphs $\mathcal{G} = \{G_1, \ldots, G_n\}$ is *independent* iff it is impossible to infer or derive any $G_i$ based on the information in the rest of the graphs $\{\mathcal{G} - G_i\}$.

*Definition 2. (Federated Graph)* Given a set of independent base graphs $\mathcal{G} = \{G_1, \ldots, G_n\}$ ($n \geq 2$) with vertex sets $V_1, \ldots, V_n$, a *federated graph* $G_{fed}$ has the vertex set $V_{fed} \subseteq \bigcup_{i=1}^{n} V_i$. The edge set $E(G_{fed}) \subseteq V_{fed} \times V_{fed}$.

FIG. 13

SYSTEMS AND METHODS FOR FEDERATING OPEN SOCIAL NETWORKS FOR ANALYSES

BACKGROUND

Generally, the popularity and versatility of social networks has resulted in more and more people belonging to a variety of social networks, each serving a different purpose. Some are for social purposes, others are for professional or other general purposes, and still others find other applications. However, these disparate and disconnected networks generally do not permit a viable opportunity to more efficiently make use of a person's connections and relationships in a manner that can be of benefit to the person and associated others.

BRIEF SUMMARY

In summary, one aspect of the invention provides a method comprising: defining a first social network with a first plurality of accounts; defining a second social network with a second plurality of accounts, the second social network being unaffiliated with the first social network; federating the first and second social networks to determine a union of the first and second social networks and an intersection of the first and second social networks; and ascertaining second-order connections between one or more of the first plurality of accounts and one or more of the second plurality of accounts, the second-order connections including connections outside of the intersection of the first and second social networks and within the union of the first and second social networks.

Another aspect of the invention provides an apparatus comprising: one or more processors; and a computer readable storage medium having computer readable program code embodied therewith and executable by the one or more processors, the computer readable program code comprising: computer readable program code configured to define a first social network with a first plurality of accounts; computer readable program code configured to define a second social network with a second plurality of accounts the second social network being unaffiliated with the first social network; computer readable program code configured to federate the first and second social networks to determine a union of the first and second social networks and an intersection of the first and second social networks; and computer readable program code configured to ascertain second-order connections between one or more of the first plurality of accounts and one or more of the second plurality of accounts, the second-order connections including connections outside of the intersection of the first and second social networks and within the union of the first and second social networks.

An additional aspect of the invention provides a computer program product comprising: a computer readable storage medium having computer readable program code embodied therewith, the computer readable program code comprising: computer readable program code configured to define a first social network with a first plurality of accounts; computer readable program code configured to define a second social network with a second plurality of accounts the second social network being unaffiliated with the first social network; computer readable program code configured to federate the first and second social networks to determine a union of the first and second social networks and an intersection of the first and second social networks; and computer readable program code configured to ascertain second-order connections between one or more of the first plurality of accounts and one or more of the second plurality of accounts, the second-order connections including connections outside of the intersection of the first and second social networks and within the union of the first and second social networks.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIGS. 4-12 variously provide tables relating to an example case study of federated social networks.

FIG. 13 provides a set of definitions for defining federated graphs.

DETAILED DESCRIPTION

Figure 1:
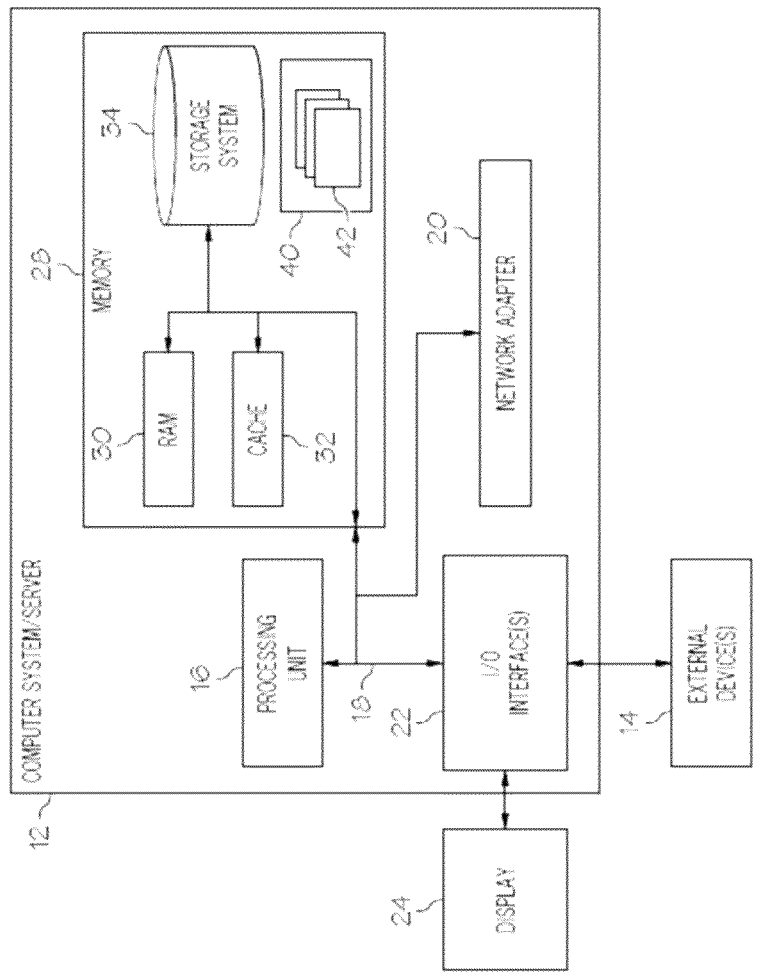
FIG. 1 illustrates a computer system.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove. In accordance with embodiments of the invention, computing node 10 may be part of a cloud network, and thus a "cloud computing node", or could be part of another type of distributed or other network, or could represent a stand-alone node.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The disclosure now turns to FIGS. 2-13. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12 in FIG. 1. In accordance with an example embodiment, most if not all of the process steps, components and outputs discussed with respect to FIGS. 2-13 can be performed or utilized by way of a processing unit or units and system memory such as those indicated, respectively, at 16 and 28 in FIG. 1, whether on a server computer, a client computer, a node computer in a distributed network, or any combination thereof.

Broadly contemplated herein, in accordance with at least one embodiment of the invention, are methods and arrangements for better synthesizing information from a person's subscribed-to social networks, in an effort to more efficiently make use of the person's connections and relationships that can be of assistance to him or her as well as others. This can be of particular use in aiming to understand the full social context of an individual, in open social networks or in in-enterprise networks where users consent to sharing their connection/relationship information.

Broadly contemplated herein, in accordance with at least one embodiment of the invention is the combination of social networks to enhance their subsequent analysis. Such combinations of social networks are referred to herethroughout as "federated" social networks. For instance, two individuals A and B might not have a connection or path between them in either of two given social networks G1 or G2 individually, but they may have a path between them in G1←→G2, or a union of the two networks. For instance, this could be through a mutual connection, e.g., A has a friend C in G1 and B has the same friend C in G2; thus, a path between A and B can be established.

In accordance with at least one embodiment of the invention, two people are regarded as "peers" if they report to the same manager in an enterprise network, and "friends" if they are connected on a social network (which may be internal or external to the enterprise).

There are potentially many social networks (SN's) in the context of an organization, wherein the following can be regarded as some of the primary categories thereof:
 "who-knows-whom", e.g., via contact lists
 "who-tags-whom", e.g., via tagging
 "who-report-to-whom", e.g., via organizational charts
 "who-writes-with-whom"—e.g., via papers and patents.

Figure 2:
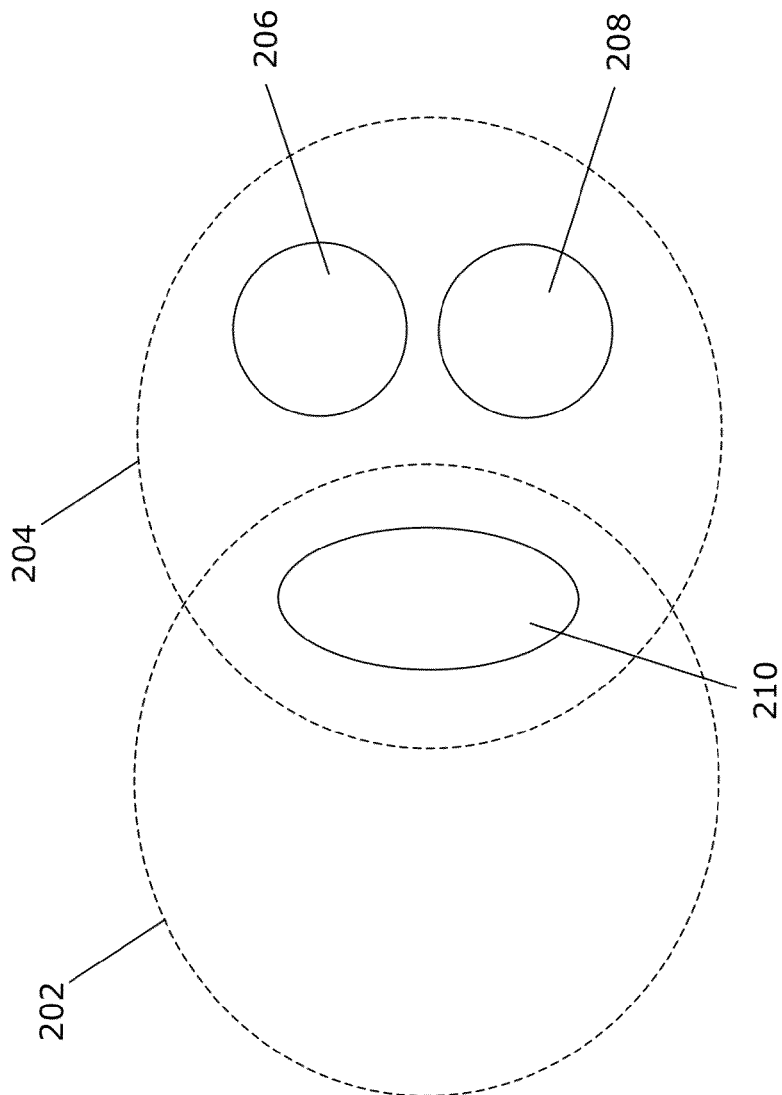
FIG. 2 schematically illustrates an arrangement of social networks.

Accordingly, formal and informal SN's such as those outlined above can and do capture different relationships between pairs (or groups) of people within an organization. In accordance with at least one embodiment of the invention, the possibility is recognized of defining new or updated categories of relationships. By way of an illustrative and non-restrictive example, FIG. 2 schematically illustrates an arrangement of social networks, via a Venn diagram of sets. Particularly, a first network 202 is one of "organization peers", or someone's manager, people who report to that manager, and reportees for that individual. A second network 204, on the other hand, is one of "contacts", or people with whom one is connected via purely social networks.

As shown, in accordance with the present example, there are smaller networks 206, 208 and 210 which are overlaid by second network 204; thus, participants in networks 206/208210 are also participants in 204. While smaller networks 206 and 208 are unique to second network 204, the smaller network 210 represents a set of participants that also participate in first network 202. Accordingly, a new category can be defined in accordance with the intersection of networks 202 and 204 in the form of smaller network 210; for instance, this may be termed a category of "co-workers" in accordance with the present example, which could be expressed as, "co-workers of a person p are those who form a maximal clique in the intersection of peers and contacts". It can now be appreciated that by federating social or organizational networks, deeper insights can be elicited with regard to behavior than merely by analyzing networks individually.

By way of further elaboration on FIG. 2, it will be appreciated that the smaller network 210 is indeed within the intersection space of networks 202 and 204. Accordingly, in this illustrative and non-restrictive example, network 210 may adopt a new or newly understood/appreciated definition in view of the fact that all its internal connections are also duplicated in both of the networks 202 and 204. The new category to result, then, can convey even a stronger bond or degree of connection than would otherwise be the case; hence, in the present example, the new "co-worker" category.

Figure 3:
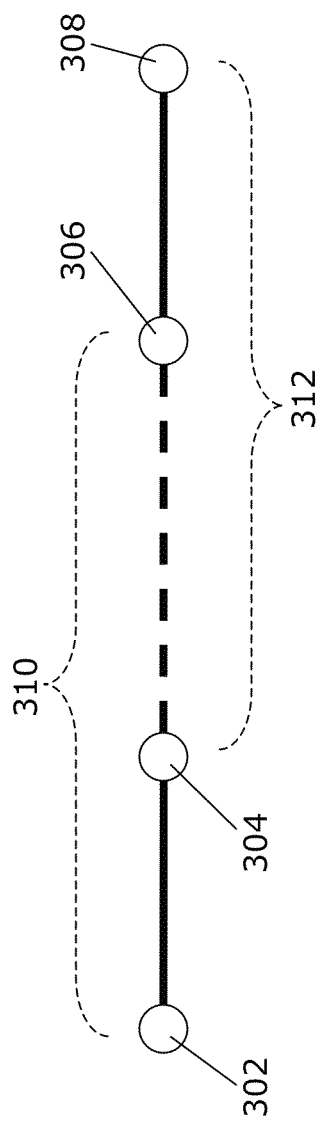
FIG. 3 schematically illustrates social networks and connections therewithin.

Accordingly, to elaborate further, in accordance with at least one embodiment of the invention, there is broadly contemplated the creation of new categories or graphs (e.g., "co-workers") by adding edges based rules defined on edges (e.g., paths, cycles, subgraphs) defined on other graphs. More particularly, there can be constructed a completely new social network that defines a new relationship (say, "uncle or aunt") based on two social networks, the "sibling" network and the "parent" network. In general, there can be complex rules for creating edges in the new graph: for example, an edge (connection) can be drawing between A and B in the new social network, provided A & B have a path between them in the "sibling" social network, and are part of a clique of a predetermined size (e.g., 10 people) in the "parent" social network. The new graph may then be analyzed for properties or other information (such as cliques, strongly connected components etc.), wherein it can be appreciated that such information could not otherwise be obtained by analyzing the graphs separately and then combining the results of the analysis. FIG. 3 schematically illustrates that while two people 302, 308 may not be connected to each other directly in a first network 310 or second network 312, they still both may be connected, respectively, to other people 304, 306 common to both networks 310/312. Thus, it will be appreciated that a path can still be established between people 302 and 308, via a union of the two networks 310/312.

The possibilities that emerge from analyzing federated networks are virtually limitless. For instance, by way of an illustrative and non-restrictive example, the following questions could be asked and answered in the context of an organization, via analyzing federated networks:
 "Are most co-authors peers?"
 "Are co-authors more 'friendly' with each other than is the case with peers?"
 "What is the status of cross-team collaboration within the organization?"
 "Are there enough cross-geography distributed team ('big bet') projects taking place?"
 "Do co-workers tend to be tagged similarly by others?"

FIGS. 4-12 variously provide tables relating to an example case study, in accordance with at least one embodiment of the invention.

Table 402, in FIG. 4, relates to basic social networks. As shown in the table, a variety of social networks can be considered in accordance with at least one embodiment of the invention, with the social networks being identified by name, source and description. In the present example, an indication is also made of whether a network is directed or undirected, wherein "directed" involves "vertical" connections (i.e., the direction matters and there may be a "vertical" relationship such as "father of"), while "undirected" involves "horizontal" or "lateral" connections (i.e., the direction does not matter and there may be a "horizontal" relationship such as "friend of".)

Figure 5:
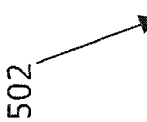

Table 502, in FIG. 5, relates to statistics of the basic networks. For each network, in accordance with the present example, the parameters considered are the number of nodes, edge density, size of maximum SCC and effective diameter. ("SCC" means "Strongly Connected Component"; see, e.g., http://en.wikipedia.org/wiki/Strongly_connected component).

Figure 6:
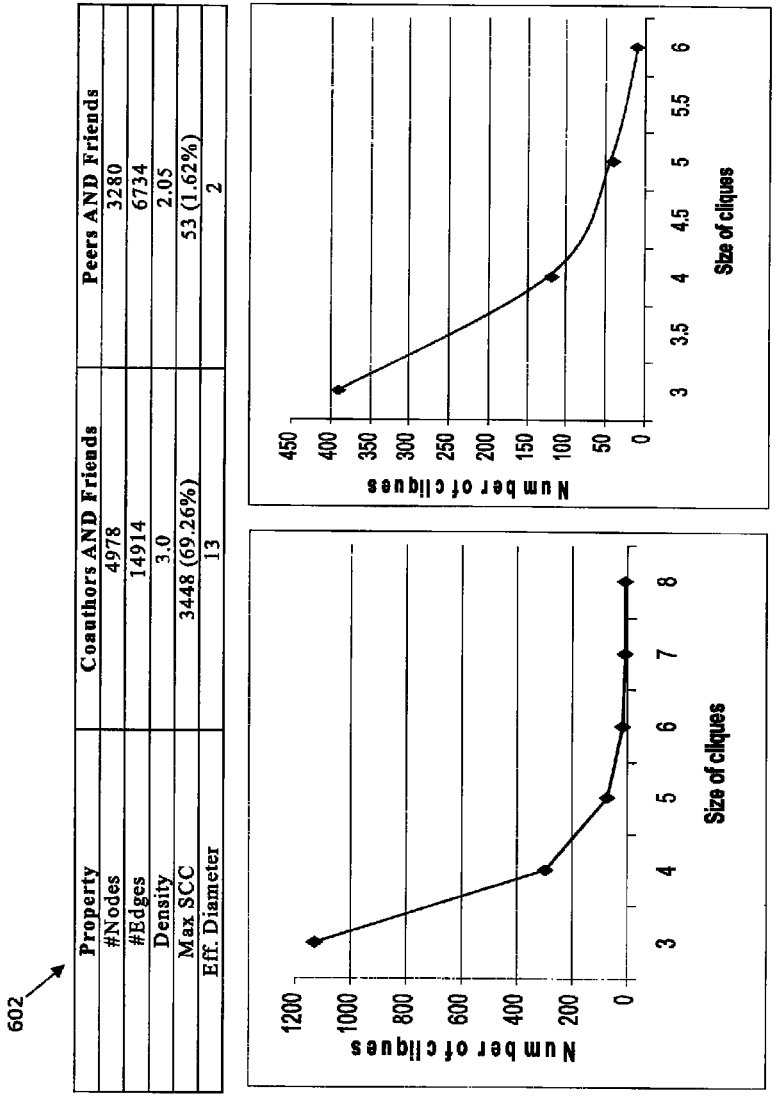

Table 602, in FIG. 6, relates to "friendliness" among peers vs. "friendliness" among co-authors. The numbers of nodes and edges are computed from the graph of relationships in the social networks by counting each. The density is the number of edges divided by the number of nodes. The size of the largest strongly connected component (SCC) is computed using any of a wide variety of suitable standard algorithms. Each column shows graphs of size of cliques (abscissa) vs. number of cliques (ordinate).

Figure 7:
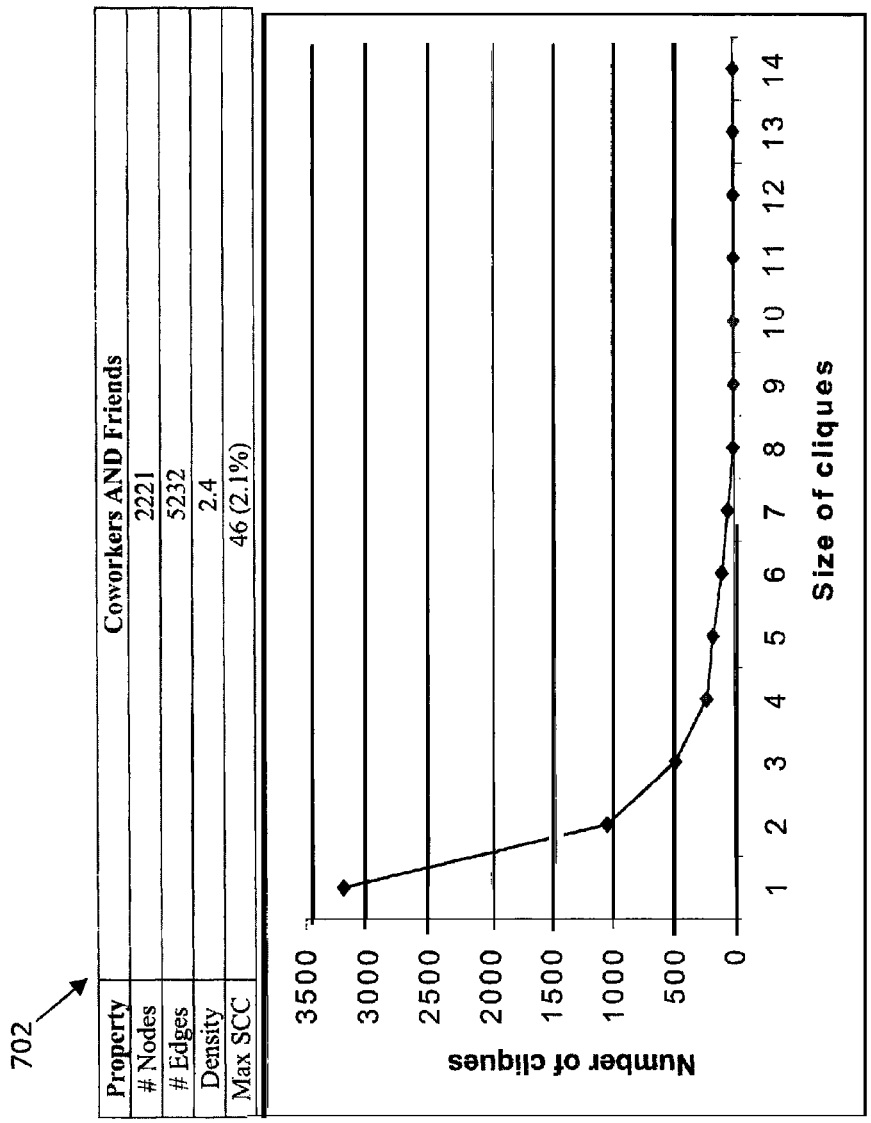

Table 702, in FIG. 7, relates to statistics of "co-workers" and "friends", or "friendliness" among "co-workers". Here, a determination is made of "friendliness" within the group of co-workers. Again, there is shown a graph of the size of cliques (abscissa) vs. number of cliques (ordinate).

By analyzing the tables and graphs from FIGS. 6 and 7, in accordance with the present example, it can readily be determined that friendliness among co-authors is greater than that among co-workers, which in turn is greater than that among peers.

In accordance with the same example case study, table 802, in FIG. 8, relates to team size distribution. At the same time, table 902, in FIG. 9, relates to team membership distribution and table 1002, in FIG. 10, relates to a survey results summary. Additionally, table 1102, in FIG. 11, relates to tag-in similarity of co-authors vs. co-workers vs. peers, while table 1202, in FIG. 12, relates to tag-out similarity of co-authors vs. co-workers vs. peers. Reference will continue to be made to FIGS. 8-12 collectively.

A distributed teammate of an employee E is defined, in accordance with at least one embodiment of the invention, as one who is not a peer of E, but rather he/she and one of his/her coworkers who is also not peer of E are connected to E and one of E's coworkers in contacts. Table 802 provides the distribution of the number of teams a particular employee is part of, while table 902 provides summary statistics of survey results in accordance with the present case study.

Figure 10:

In turn, by analyzing the tables and graphs from FIGS. 10-12, in accordance with the present example, the tag-in similarity among co-workers is greater among co-workers than it is among co-authors, which in turn is greater than among peers. Further, it can be determined that tag-out is same as tag-in. (Tag-out represents the behavior of an individual tagging others, while tag-in represents the behavior of others tagging the same individual.) If relative density (or edge coverage) is compared, it can be seen that, in the present example, Co-workers tag more similarly than Co-authors, who tag more similarly than Peers. This implies that Co-workers are more similar to each other than are Co-authors, who are more similar to each other than are Peers. It can be noted in the present example that tag-out similarity is consistent with the tag-in similarity. In other words, here "similar" means that tagging behavior is similar in general within a tagging category (tag-in or tag-out), and it is noted in the present example that there is also similarity both in terms of how an individual tags others (tag-out), and how others tag him/her (tag-in).

It should be appreciated and understood that FIGS. 4-12 merely present a case study by way of illustrative example, and that methods and arrangements according to at least one embodiment of the invention can be applied to a very wide range of practical settings.

FIG. 13 provides a set 1302 of two definitions for defining federated graphs, in accordance with at least one embodiment of the invention. "Definition 1" conveys a definition of independent graphs, while in contrast "Definition 2" conveys a definition of federated graphs. Particularly, as can be appreciated from FIG. 13, "Definition 1" conveys that independent graphs (or networks or, in the case of at least one embodiment of the invention, social networks) will not per se have connections between any account in one graph and any and all accounts in other graphs. On the other hand, "Definition 2" conveys the nature of a federated graph $G_{fed}$ wherein, in the context of a union of two or more graphs (or networks or, in the case of at least one embodiment of the invention, social networks), a vertex set can be ascertained at the intersection of two or more graphs and an edge set which includes every connection between every account and all other accounts within the entire union of the two or more graphs.

It can accordingly be appreciated, in accordance with at least one embodiment of the invention, that first social network with a first plurality of accounts is defined, as well as a second social network with a second plurality of accounts, the second social network being unaffiliated with the second social network. In this respect, the second social network is not otherwise a component of or party to a space normally associated with the first social network; for instance, the first and second social networks could be represented by two different mainstream social networks belonging to two different social networking sites or companies, or by a mainstream social network plus an enterprise (business-related) social network. In other words, the first and second social networks otherwise normally are not affiliated in any practical or logistical manner.

It can further be appreciated, in accordance with at least one embodiment of the invention, that in the context mentioned immediately above the first and second social networks are federated to determine a union of the first and second social networks and an intersection of the first and second social networks, and second-order connections between one or more of the first plurality of accounts and one or more of the second plurality of accounts are ascertained, the second-order connections including connections outside of the intersection of the first and second social networks and within the union of the first and second social networks. In other words, such second-order connections would otherwise not exist or could not be ascertained among the networks individually and exist in the space outside of the intersection of the two networks. In accordance with at least one embodiment of the invention, this would represent connections in the aforementioned "edge set" but outside of the aforementioned "vertex set".

It will be appreciated, in accordance with at least one embodiment of the invention, that connections between one or more of the first plurality of accounts and one or more of the second plurality of accounts can be ascertained, the additional connections including connections inside of the intersection of the first and second social networks. In accordance with at least one embodiment of the invention, this would represent connections inside of the aforementioned "vertex set".

It will be appreciated, in accordance with at least one embodiment of the invention, that connections connections of a third or higher order between one or more of the first plurality of accounts and one or more of the second plurality of accounts can be ascertained, the third or higher order connections including connections outside of the intersection of the first and second social networks. In accordance with at least one embodiment of the invention, this would represent connections between accounts that involve two or more intermediaries or steps in order to ascertain a connection per se.

It will be appreciated, in accordance with at least one embodiment of the invention, that a third social network with a third plurality of accounts can be defined, the third social network being unaffiliated with the first and second social networks. In accordance with at least one embodiment of the invention, the same can hold for fourth, fifth, sixth and even additional social networks, with corresponding pluralities of accounts included in each, and with all such networks being unaffiliated with respect to one another.

Figure 14:
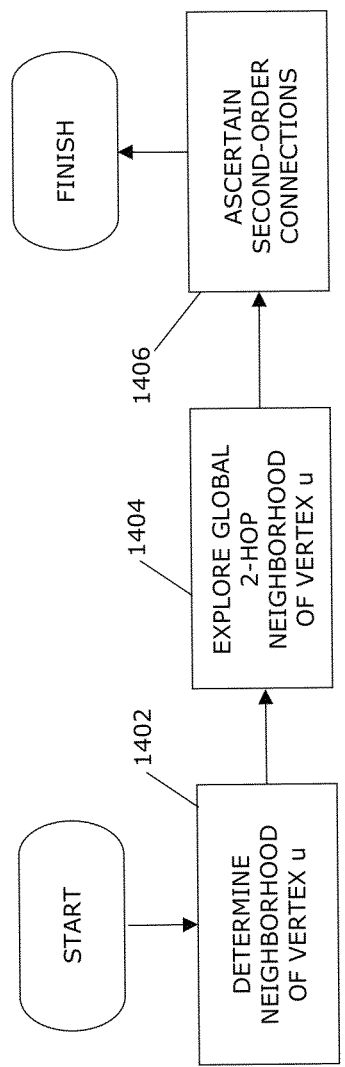
FIG. 14 schematically conveys steps for federating social networks.

In accordance with at least one embodiment of the invention, and as shown schematically in FIG. 14, federation of social networks takes place via a variety of steps, by way of ascertaining connections subsequently to be analyzed. First, a neighborhood of a vertex u in a federated graph $G_{fed}$ is computed/determined based only on the local neighborhoods of (i.e., edges incident on) the same vertex u in the base graphs (1402). Next, the federated graph permits exploration of a global 2-hop neighborhood of a vertex u to construct a neighborhood of u in $G_{fed}$ (1404). Finally, the federated graph permits the exploration of arbitrary subgraphs (such as paths and cycles) in the base graphs to construct the neighborhood of u in $G_{fed}$ (1406). While any of these three steps is sufficient individually to ascertain connections from $G_{fed}$ that can be of tremendous use in subsequent analysis, it can also be appreciated that all three of the steps can combine to develop a wide variety of connections and relationships that can then be analyzed for useful detail in a manner such as exemplified in the case study of FIGS. 4-12.

More particularly, in view of the foregoing, it can be appreciated that by constructing a graph based on a complex combination of edges, it is possible to derive insights that otherwise would not possible from other methods, especially if social networks are merely analyzed one at a time. Potential advantages of this are numerous, including: a provision to organizational heads of invaluable insights about organizational behavior; for a telephone or telecom company, for instance, a capability of analyzing call, SMS and VAS graphs and federating them, to obtain deeper insights into buying behavior and relationships; and, in the context of law enforcement agencies, affording a capability to better track fraudulent or suspicious activity via federating information from various telephone or telecom companies (e.g., SMS and call graphs).

Figure 15:
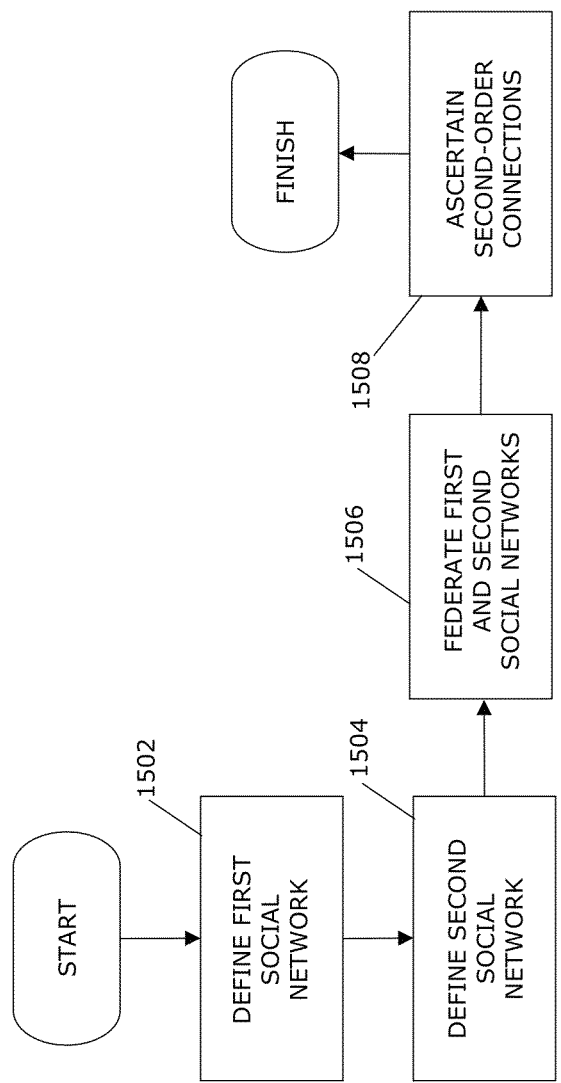
FIG. 15 sets forth a process more generally for constructing and analyzing federated social networks.

FIG. 15 sets forth a process more generally for constructing and analyzing federated social networks, in accordance with at least one embodiment of the invention. It should be appreciated that a process such as that broadly illustrated in FIG. 15 can be carried out on essentially any suitable computer system or set of computer systems, which may, by way of an illustrative and on-restrictive example, include a system such as that indicated at 12 in FIG. 1. In accordance with an example embodiment, most if not all of the process steps discussed with respect to FIG. 15 can be performed by way a processing unit or units and system memory such as those indicated, respectively, at 16 and 28 in FIG. 1.

As shown in FIG. 15, a first social network with a first plurality of accounts is defined (1502), as well as a second social network with a second plurality of accounts (1504), the second social network being unaffiliated with the second social network. The first and second social networks are federated (1506) to determine a union of the first and second social networks and an intersection of the first and second social networks, and second-order connections between one or more of the first plurality of accounts and one or more of the second plurality of accounts are ascertained (1508), the second-order connections including connections outside of the intersection of the first and second social networks and within the union of the first and second social networks.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. An apparatus comprising:
    one or more processors; and
    a computer readable storage memory device having computer readable program code embodied therewith and executable by the one or more processors, the computer readable program code comprising:
    computer readable program code configured to define a first social network with a first plurality of accounts;
    computer readable program code configured to define a second social network with a second plurality of accounts the second social network being unaffiliated with the first social network;
    computer readable program code configured to federate the first and second social networks to determine a union of the first and second social networks and an intersection of the first and second social networks; and
    computer readable program code configured to ascertain second-order connections between one or more of the first plurality of accounts and one or more of the second plurality of accounts, the second-order connections including connections outside of the intersection of the first and second social networks and within the union of the first and second social networks;
    wherein to federate the first and second social networks comprises:
        constructing a first graph from the first social network;
        constructing a second graph from the second social network;
        determining a first federated graph portion on a basis of edges incident on a vertex set formed from an intersection of the first and second graphs;
        determining a second federated graph portion via ascertaining a global 2-hop neighborhood of the vertex set;
        determining a third federated graph portion via exploring arbitrary subgraphs among the first and second graphs; and
        combining the first, second and third federated graph portions to form a federated graph; and
    the computer readable program code further comprising computer readable program code configured to provide, for subsequent analysis, connections and relationships between accounts in the first and second social networks and within the federated graph.

2. A computer program product comprising:
    a computer readable storage memory device having computer readable program code embodied therewith, the computer readable program code comprising:
    computer readable program code configured to define a first social network with a first plurality of accounts;
    computer readable program code configured to define a second social network with a second plurality of accounts the second social network being unaffiliated with the first social network;
    computer readable program code configured to federate the first and second social networks to determine a union of the first and second social networks and an intersection of the first and second social networks; and
    computer readable program code configured to ascertain second-order connections between one or more of the first plurality of accounts and one or more of the second plurality of accounts, the second-order connections including connections outside of the intersection of the first and second social networks and within the union of the first and second social networks;
    wherein to federate the first and second social networks comprises:
        constructing a first graph from the first social network;
        constructing a second graph from the second social network;
        determining a first federated graph portion on a basis of edges incident on a vertex set formed from an intersection of the first and second graphs;
        determining a second federated graph portion via ascertaining a global 2-hop neighborhood of the vertex set;
        determining a third federated graph portion via exploring arbitrary subgraphs among the first and second graphs; and
        combining the first, second and third federated graph portions to form a federated graph; and
    the computer readable program code further comprising computer readable program code configured to provide, for subsequent analysis, connections and relationships between accounts in the first and second social networks and within the federated graph.

3. The computer program product according to claim 2, wherein said computer readable program code is further configured to ascertain additional connections between one or more of the first plurality of accounts and one or more of the second plurality of accounts, the additional connections including connections inside of the intersection of the first and second social networks.

4. The computer program product according to claim 2, wherein said computer readable program code is further configured to ascertain connections of a third or higher order between one or more of the first plurality of accounts and one or more of the second plurality of accounts, the third or higher order connections including connections outside of the intersection of the first and second social networks.

5. The computer program product according to claim 2, wherein said computer readable program code is further configured to define a third social network with a third plurality of accounts, the third social network being unaffiliated with the first and second social networks.

* * * * *